Feb. 24, 1970 A. A. WINER ET AL 3,497,419
METHOD OF ORIENTING FIBRES BY MEANS OF AC AND DC VOLTAGES
Filed Feb. 17, 1967 5 Sheets-Sheet 1

FIG.1A   FIG.1B

Effect of a Direct Current Electrical Field on Milled Chrysotile Fibre Using Rectangular Electrodes.

INVENTORS
ALBERT A. WINER
HENRY M. WOODROOFFE
BY Cushman, Darby & Cushman
ATTORNEYS Feb. 24, 1970   A. A. WINER ET AL   3,497,419
METHOD OF ORIENTING FIBRES BY MEANS OF AC AND DC VOLTAGES
Filed Feb. 17, 1967   5 Sheets-Sheet 2

Formation of a Fibre Chain (Point Source).

INVENTORS
ALBERT A. WINER
HENRY M. WOODROOFFE
BY
Cushman Darby & Cushman
ATTORNEYS

Stained Chrysotile Fibre; Oriented by a-c Field, in a Polyester Resin.

FIG.4

Oriented 4T Fibre

FIG.5

United States Patent Office 3,497,419
Patented Feb. 24, 1970

3,497,419
METHOD OF ORIENTING FIBRES BY MEANS OF AC AND DC VOLTAGES
Albert A. Winer and Henry M. Woodrooffe, Ottawa, Ontario, Canada, assignors to Canadian Patents and Development Limited, Ottawa, Ontario, Canada, a corporation of Canada
Filed Feb. 17, 1967, Ser. No. 616,904
Int. Cl. D21f
U.S. Cl. 162—192                              1 Claim

ABSTRACT OF THE DISCLOSURE

Asbestos fibers are oriented substantially parallel to each other by dispersing the fibers in a liquid medium and then subjecting the dispersed fibers to an electric field and maintaining the electric field at a selected intensity to produce the desired orientation.

---

This invention relates to a method of orienting selected non-metallic and metallic fibres which are natural dipoles or in which dipoles may be induced in a preferred array using alternating or direct current E.M.F.'s. The invention has particular utility as a stage in a measuring system for the determination of the length distribution of fibres in a given bulk sample, and the orientation of fibres in a preferred manner. The invention has utility in the orientation of asbestos, silicon nitride, and other fibrous formations including whiskers.

It is an object of one feature of this invention to provide a method of orienting absestos fibres.

A number of minerals have a fibrous or pseudo fibrous habit, but lack the physical or chemical characteristics that are required in a fibrous mineral for industrial use. The Oxford Dictionary defines a fibre as a fine filament or a slender threadlike substance. In "Fibre Structure" by Hearle N. Peters, (Butterworth) a fibre is defined as a unit of matter characterised by flexibility, fineness, and a high ratio of length to thickness.

In commerce, the term "asbestos" is applied to five silicate minerals; the most widely used is chrysotile, a hydrous magnesium silicate. The others are crocidolite, a sodium-iron silicate; amosite, a silicate of both iron and magnesium partly hydrated; and tremolite and anthophyllite, which are both silicates of calcium, magnesium and iron, and actinolite which is a calcium-iron-magnesium amphibole where amphiboles represent chemically a series of metasilicates corresponding to the general formula $RSiO_3$.

Chrysotile, because of its physical characteristics, is an important raw material in many industrial processes. When of the proper texture, the longer fibres may be processed in much the same manner as organic staple fibres. Consequently it may be carded, spun and woven into cloths of different weights, thicknesses and qualities. These cloths are used in the manufacture of heat-resistant friction materials.

The shorter-fibre grades of asbestos have the greatest number of uses. This type is used in moulding of plastics, the manufacture of floor tiling and protective coatings, the paint industry and other applications requiring a fibrous filler with the physical characteristics of asbestos.

The automobile industry uses asbestos products in large quantities; these uses include woven and moulded brake linings, clutch facings and pressure gaskets. Undercoating compounds provide an important use for very short grades of fibre.

In some of the aforementioned applications the physical characteristics of the end product can be improved by the orientation of the constituent fibres during the liquid phase of production. The dynamic and static orientation of non-metallic fibres in liquids has been a problem in the production of compositions having enhanced physical characteristics. Prior known techniques have not been found adequate to give the highly preferred orientation required.

Polarization, and subsequent alignment of particles of high dielectric material such as phosphorus is taught in U.S. Patent 2,887,601 to Bain, which patent provides a method which requires that the particles establish contact with each other and the associated electrodes in order to form a chain. Further, the method does not differentiate between induced and naturally occurring polarized particles.

The novel method, in accordance with the present invention, does not require particle to particle contact or particle to electrode contact but rather alignment of the particles due to induced dipoles of the electric field.

A true electrostatic method of orientation of fibres is taught in U.S. Patent 3,082,138 to Hjelt, in which patent, the method disclosed provides for the contact charging of particles followed by the particles migrating to an electrode of opposite polarity. Such a technique is used in electrostatic rug manufacture.

The present invention does not require particle to particle contact.

A further electrostatic method is shown in U.S. Patent 2,998,051 to Sittel wherein contact charging of particles takes place followed by repulsion or attraction depending on the charge and the electrode.

In U.S. Patent 3,073,732 to Hunsdiecker there is shown a method of orienting plate-type crystals wherein an external electric field is used to establish preferred orientation without direct contact between crystals and an electrode. However, this patent does not refer to a method of orienting fibres in a dynamic fluid system through the application of an external electrical field except where the crystals are first contact charged, that is an electrostatic system. Further, none of the above-mentioned patents discloses the preferred orientation of asbestos fibres.

The present invention envisages the following applications:

The formation of a fibre-resin composite in which fibres are arrayed in a preferred orientation to develop optimum properties for design application, The formation of asbestos paper, board, etc. by arranging the asbestos fibres in a preferred direction and laying down various mats of fibres, The strengthening of asbestos cement materials, sheets, etc. through orienting or by joining the various length of fibres in a preferred direction to give optimum design properties, The formation of a single asbestos strand which under the influence of an electrical field has been made from shorter fibres. This strand may possibly be of sufficient strength to be used for spinning, The scanning of asbestos fibres in the simplified investigation of its various physical properties by the orienting of the fibres in a parallel array.

In accordance with the foregoing object of orienting asbestos fibres, the method comprises the steps of dispersing said fibres in a fluid medium, subjecting said fluid medium and the dispersed fibres to an electric field of selected intensity and maintaining said field for a selected period of time adequate to orient said fibres.

For a theoretical basis for dielectric polarization reference is made to the following: Classical Electricity and Magnetism, Abraham Becker (Blackie & Sons, Ltd.,) pps. 72 and 73; Introduction to Theoretical Physics, L. Page (D. Van Nostrand Co.) third edition, pp. 393 to 397 and Electromagnetic Theory, Stratton (McGraw-Hill Book Co.) pp. 175 to 176; Dielectrics and Waves, A. Von Hippel, John Wiley & Sons, Inc. (1954); Dipole Moments, The Collected Papers of Peter J. W. Debye, Interscience Publishers, Inc., N.Y. (1954).

The invention will now be described with reference to the following figures, in which:

FIGS. 1 (a) and (b) shows the effect of a D.C. electrical field on milled chrysotile fibre in transformer oil using rectangular electrodes, FIGS. 2 (a), (b), and (c) shows three stages in the formation of a fibre chain of chrysotile fibres in transformer oil using point sources, FIGS. 3 (a) and (b) show, respectively, dispersed and chained stained chrysotile fibre in a polyester resin, and oriented by an A.C. field.

The development of the invention included investigation of:

(1) Dispersion of the fibre
(2) Preferred orientation of the fibre
(3) Measurement of the fibre length distribution after orientation.

Before discussing the invention in detail, the following information is provided concerning the grading of asbestos.

The following list of standard asbestos grades was set up by the Committee on Uniform Classification and Grading of Asbestos Mines Products.

Asbestos mines products are divided into two classes: "Crude Asbestos" and "Milled Asbestos" respectively defined as follows:

"Crude Asbestos" consists of the hand selected cross vein material essentially in its native or unfiberized form.

"Milled Asbestos" consists of all grades produced by mechanical treatment of asbestos ore.

The "Crude Asbestos" and the "Milled Asbestos" are subdivided into groups designated and defined here below:

Classification of the "Milled Asbestos" grades, in groups Nos. 3 to 7 inclusive, unless otherwise specified, is based on the Quebec Standard Testing Machine.

*Subdivision of the Groups of Canadian Chrysotile Asbestos*

CRUDE ASBESTOS

| Class | Standard Designation of Grade | Description |
|---|---|---|
| Group No. 1 | Crude No. 1 | Consists basically of crude ¾ inch staple and longer. |
| Group No. 2 | Crude No. 2 | Consists basically of crude ⅜ inch staple up to ¾ inch. |
|  | Crude run-of-mine | Consists basically of unsorted crudes. |
|  | Crudes sundry | Consists of crudes other than above specified. |

MILLED ASBESTOS

| Group No. 3 to No. 9, Inclusive | Standard Designation of Grade | Guaranteed Minimum Shipping Test | | | |
|---|---|---|---|---|---|
| Group No. 3 | 3D | 10.5 | 3.9 | 1.3 | 0.3 |
|  | 3F | 7.0 | 7.0 | 1.5 | 0.5 |
|  | 3K | 4.0 | 7.0 | 4.0 | 1.0 |
|  | 3R | 2.0 | 8.0 | 4.0 | 2.0 |
|  | 3T | 1.0 | 9.0 | 4.0 | 2.0 |
|  | 3Z | 0.0 | 8.0 | 6.0 | 2.0 |
| Group No. 4 | 4D | 0.0 | 7.0 | 6.0 | 3.0 |
|  | 4H | 0.0 | 5.0 | 8.0 | 3.0 |
|  | 4J | 0.0 | 5.0 | 7.0 | 4.0 |
|  | 4K | 0.0 | 4.0 | 9.0 | 3.0 |
|  | 4M | 0.0 | 4.0 | 8.0 | 4.0 |
|  | 4R | 0.0 | 3.0 | 9.0 | 4.0 |
|  | 4T | 0.0 | 2.0 | 10.0 | 4.0 |
|  | 4Z | 0.0 | 1.5 | 9.5 | 5.0 |
| Group No. 5 | 5D | 0.0 | 0.5 | 10.5 | 5.0 |
|  | 5K | 0.0 | 0.0 | 12.0 | 4.0 |
|  | 5M | 0.0 | 0.0 | 11.0 | 5.0 |
|  | 5R | 0.0 | 0.0 | 10.0 | 6.0 |
| Group No. 6 | 6D | 0.0 | 0.0 | 7.0 | 9.0 |
| Group No. 7 | 7D | 0.0 | 0.0 | 5.0 | 11.0 |
|  | 7F | 0.0 | 0.0 | 4.0 | 12.0 |
|  | 7H | 0.0 | 0.0 | 3.0 | 13.0 |
|  | 7K | 0.0 | 0.0 | 2.0 | 14.0 |
|  | 7M | 0.0 | 0.0 | 1.0 | 15.0 |
|  | 7R | 0.0 | 0.0 | 0.0 | 16.0 |
|  | 7T | 0.0 | 0.0 | 0.0 | 16.0 |
|  | 7W | 0.0 | 0.0 | 0.0 | 16.0 |
| Group No. 8 | 8S | Under fifty pounds per cubic foot loose measure | | | |
|  | 8T | Under seventy-five pounds per cubic foot loose measure | | | |
| Group No. 9 | 9T | Over seventy-five pounds per cubic foot loose measure | | | |

In a preliminary approach the effect of placing the fibre in a high voltage D-C field was studied.

D-C HIGH VOLTAGE—AIR MEDIUM

A coronatron separator with a Beta 30 kv. D-C power supply was selected as a suitable apparatus for exploratory experiments on the effect of a unidirectional high voltage D-C field on chrysotile fibre. This type of unit is referred to in minimal dressing as an electrostatic separator.

The behaviour of random oriented samples of several different grades of milled asbestos fibre was observed. It was noted that fibres were teased into parallel orientation from matted bundles. The preferred orientation was parallel to the field, between the electrodes, with a tendency to bridge this gap.

In the short fibres (group 7), the individual fibres joined to form a chain similarly bridging the electrodes. Interruption to the field did not cause a release of the attachment between these fibres. No breakdown of the field or arcing occurred until a voltage of 20 to 30 kv. was reached.

It was noted that the effect of the D-C field in air was one of orienting chrysotile fibres.

D-C HIGH VOLTAGE—LIQUID MEDIUM

In view of the above results, it was decided to study the effect of D-C high voltage on chrysotile in a liquid medium. In a liquid there was opportunity to develop dispersion techniques through choice of liquid or the addition of suitable arrangements.

A container was constructed of ½ in. Plexiglas with inside dimensions of 4 x 4 x 6 in. high. Two 4 x 4 x ¹⁄₁₆ in. aluminum plate electrodes were placed in the container at opposite sides. Experiments were then conducted using various fluids and fibres. The fibres were dispersed by stirring and the suspension viewed with a low power stereomicroscope using angular incident backlighting. Voltage was supplied by a Beta Electric Corporation variable high-voltage D-C supply, with reversible polarity. The voltage was varied from 0 to 30 kv.

The observations are summarized in Table 1. Initially the fibres were randomly dispersed but upon application of voltage, orientation of the fibres was initiated. Increasing the voltage caused chaining of the fibres between the electrodes and turbulence of the liquid. Finally the chains of fibres undulating in the turbulent zone moved closer to form strands. These effects were observed with either polarity.

TABLE 1.—EFFECT OF A D-C FIELD ON THE ORIENTATION OF CHRYSOTILE FIBRES

| Medium | Dispersion Ability | Orientation by Electrical Field |
|---|---|---|
| Air | Poor | Good. |
| Tap Water | Good | No effect. |
| Distilled water | do | Poor. |
| Distilled water and tripolyphosphate | Excellent | No effect. |
| Xylene | Fair | Fair. |
| Toluene | do | Do. |
| Benzene | do | Do. |
| Tween 80 | Good | Good. |
| Mineral oil | Very good | Do. |
| Transformer oil | Good | Very good. |
| Silicon (Dow 200) | do | Do. |
| Epoxye resin | Excellent | Excellent. |
| Tetrabromoethane | Poor (matting) | |

The more viscous fluids such as non-polar oils and resins and solutions with dispersing agents dispersed the fibres most effectively. Unfortunately water was not a practicable medium for these experiments for obvious reasons associated with the dielectric constant of water.

Of all the liquids studied above transformer oil had the best combination of properties suitable for investigation in a dynamic system.

Figure 1A:
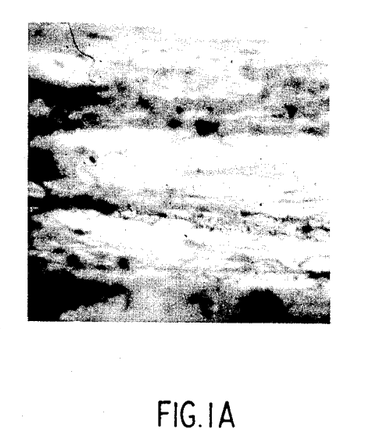
Figure 1B:
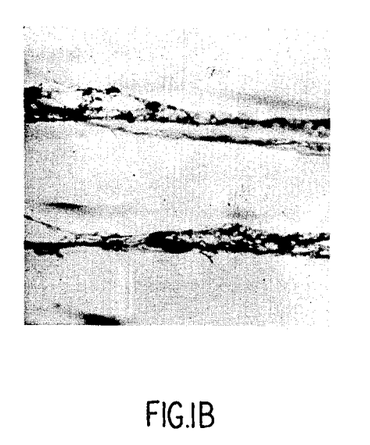

FIGURES 1(a) and (b) are photographs of the fibre suspension using aluminum plate electrodes. The formation of (a) chains and (b) strands is clearly evident.

These photographs show the orientation of the fibres parallel to the field. Initially the particles appeared to turn on their axes and then to move toward the electrodes, eventually forming chains and strands that persisted when the electrical field was removed.

Figure 2A:
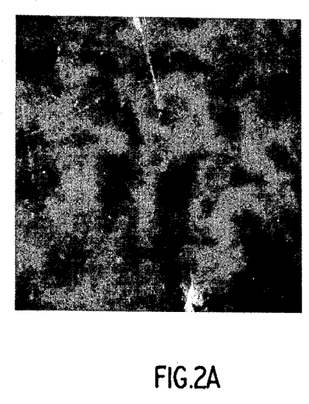
Figure 2B:
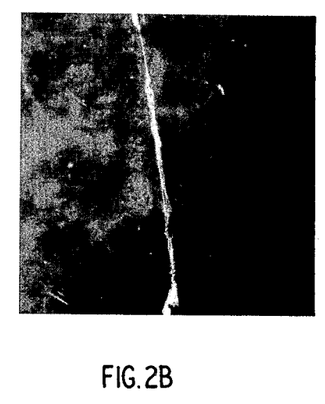
Figure 2C:
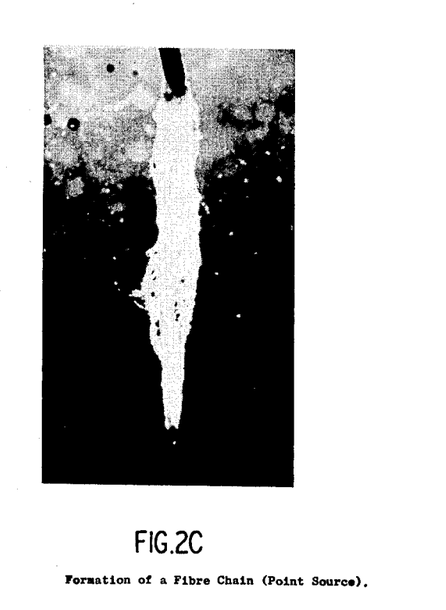

FIGURE 2, shows in sequence the formation of a fibre chain when point source electrodes are used.

Because the particles did not change direction upon reversal of polarity using direct current this indicates they are non-permanent dipoles.

A-C HIGH VOLTAGE—LIQUID MEDIUM

Following the above D-C experiments, the application of fields created by alternating current was considered. The equipment consisted of a 115 v. 60 c./s. Variac transformer, a 10 kv. transformer and the plastic container used in the D-C experiments. A transformer oil was used to make suspensions of the selected fibrous samples.

A-C voltage was applied over a range from 0 to 10 kv. This allowed a more precise control at lower voltages than was possible in the D-C experiments using a wide range power supply.

A summary of results obtained from A-C, and D-C experiments is shown for comparison in Table 2. Results for both systems were similar. A column for optical anisotropy (obtained from the literature) is included in this table to note any correlation with orientation. Optical anisotropy, at times is indicative of other anisotropic properties which may affect fibre alignment.

It should be noted that the results recorded in Table 2 are preliminary observations of a number of experiments. The inclination to horizontal, noted in one sample of tremolite and one of amosite are approximate figures. The results of a more intensive study to establish the minimal voltage which causes alignment of fibres, follows hereinafter.

Discussion of experiments with A-C and D-C in a liquid media

On thirteen samples representing eight different kinds of fibre, two of which were man-made, twelve showed orientation in high voltage fields. There were in some cases differences in level between the A-C and D-C voltages required for orientation. In other cases orientation occurred in one system and not in the other system. For one sample of tremolite the critical voltage for orientation of the D-C system was three times that of the A-C system while in a sample from another location the critical D-C voltage was one-half that of the A-C system. These tremolites are from well-known occurrences and are similar in exhibited physical characteristics. Fibrous gypsum oriented in the alternating current system; with glass fibre, the reverse was the case. Only fibrofrax (fibrous aluminum silicate) did not show any orientation with A-C and only slight orientation with D-C. This coincided with a lack of optical anisotropy in the sample but cannot be regarded as conclusive evidence or correlation.

The direction of orientation of fibres is dependent on the electrical anisotropic properties of the fibres. The theoretical background for dielectric constant measurements also provides explanation for the behaviour of the asbestos fibres and indeed other fibres in an electrical field. If a substance is introduced into an electrical field, it is subject to polarization, Daniels et al., "Experimental Physical Chemistry," McGraw-Hill Book Co., Inc., New York (1956). A non-polar molecule will becomes polarized in a field. The positive and negative charges are separated and the particle acquires a moment, i.e., becomes an induced dipole. Orientation will follow if the field is intensified. Where the two dielectric constants are different the equation cannot be used per se but a form factor must be introduced to allow for the difference between the constants of particle and medium and also for the deviation of the particle from the spherical, A. Voet, "Dielectrics and Rheology of Non Aqueous Dispersions," J. Phys. and Coll. Chem., 51, 1037 (1957). The dielectric constant can therefore be a measure not only of the moment but also of the direction of fibre alignment in relation to the electrical field.

From the above discussion it may be inferred that a permanent dipole will orient itself and the poles will be of opposite charge to the electrodes they face. Reversing the polarity of a D-C field should cause the dipole to change its direction. On the other hand an induced dipole

TABLE 2.—EFFECT OF AN A.C. ELECTRICAL FIELD ON SELECTED FIBRES

[In Transformer Oil]

| Sample | Alternating Current | | Direct Current | | Optical Anisotropy |
|---|---|---|---|---|---|
| | Voltage Applied, kv. | Remarks [1] | Voltage Applied, kv. | Remarks [1] | |
| Tremolite, Stanton, Province of Quebec | 0–10 | Oriented at 5 kv | 0–30 | Oriented at 10–15 kv | Moderate to strong. |
| Tremolite, Renfrew Co., Ont | 0–10 | Oriented at 8 kv., 30° to horizontal field | 0–30 | Oriented at 3–4 kv | |
| Chrysotile (slip fibre) | 0–10 | Oriented at 3 kv | 0–30 | | Moderate. |
| Amosite (South Africa) | 0–10 | Oriented at 5 kv., 45° to horizontal field | 0–30 | Oriented at 5 kv | Medium. |
| Crocidolite (South Africa) | 0–10 | Oriented at 5 kv | 0–30 | Oriented at 3 kv | |
| Chrysotile, Yukon Territory | 0–10 | Oriented at 3 kv | 0–30 | do | Moderate. |
| Chrysotile 4T, Thetford Mines, Province of Quebec | 0–10 | do | 0–30 | Oriented at 3.5 kv | Do. |
| Glass fibre | 0–10 | No orientation | 0–30 | Orientation at 2–4 kv | Spotty. |
| Fibrofrax (aluminum silicate fibre) | 0–10 | Very slight | 0–30 | No orientation | None. |
| Fibrous gypsum, North-West Territory | 0–10 | Orientation 4–5 kv | 0–30 | do | Peak. |
| Actinolite | 0–10 | Orientation 3–5 kv | 0–30 | | Moderate. |
| Chrysotile (from dolomite), Point Comfort, Province of Quebec | 0–10 | do | 0–30 | Oriented at 3–5 kv | Do. |
| Chrysotile (Russia) | 0–10 | Orientation at 4 kv | 0–30 | Oriented at 3 kv | Do. |

[1] Orientation parallel to direction of field unless otherwise stated. All other materials Chryslattine.

will not show any change of direction. Since asbestos fibres showed no change of direction with either A-C or D-C fields even with extended time periods it is assumed that the milled chrysotile fibres are induced dipoles.

The procedure used for the determination of the chrysotile polarity is in essence similar to that (previously) used in (the) aforementioned experiments. The liquid used is mineral oil and it has already been stated that other liquids can be used. However, mineral oil and transformer oil are particularly suitable, especially for experimental purposes, because of their respective viscosities.

The purpose of these further experiments was to determine the critical voltages for orientation of the fibres shown in Table 3, and whether a particular fibre was a natural or induced dipole. The procedure adopted was that which was the most efficient and available at the time.

FIBRE STAINING

Preliminary work showed that the natural asbestos fibres were barely visible in some liquids, and invisible in others, e.g., clear plastics. Therefore some method of staining the fibre appeared desirable. Certain mineralogical stains used for hydrous silicates seemed appropriate. Iodine was also considered since it is used for surface area determinations of magnesia minerals. It should be understood that staining is not a prerequisite in this or any other discussion of results in this disclosure.

The fibres were placed in a solution of the dye where they were allowed to remain until completely wetted. They were then removed and dried by an air stream. Since matting took place after complete drying, the fibres were removed slightly damp.

Iodine required a different procedure. Crystals of iodine

TABLE 3.—MINIMUM HIGH VOLTAGE FIELD REQUIREMENTS FOR THE ORIENTATION AND CHAINING OF SELECTED FIBROUS MATERIALS IN DIELECTRIC LIQUIDS

| Material | Liquid [1] | Minimum Voltage Gradient, volts/cm. | | | |
| --- | --- | --- | --- | --- | --- |
| | | A-C | | D-C | |
| | | Orientation | Chaining | Orientation | Chaining |
| Milled chrysotile (Quebec) | Transformer oil | 70 | 120 | 65 | 160 |
| | Polyester resin | 100 | 250 | 75 | 200 |
| | Epoxy resin | 100 | 200 | 75 | 175 |
| | Silicone 200 viscosity | 250 | 700 | 250 | 600 |
| | Heavy mineral oil | | | | |
| Tremolite (Province of Quebec) | Transformer oil | 65 | 500 | 80 | 700 |
| | Polyester resin | 1,200 | | 1,100 | |
| | Epoxy resin | 1,250 | | 1,100 | |
| | Silicone 200 | 150 | | 500 | 1,500 |
| | Heavy mineral oil | 100 | 1,200 | 400 | 1,000 |
| Glass fibre | Transformer oil | | | 240 | 400 |
| | Polyester resin | | | 1,200 | 2,500 |
| | Epoxy resin | | | 1,250 | 2,500 |
| | Silicone 200 | | | 1,000 | 2,500 |
| | Heavy mineral oil | | | 520 | 2,200 |
| Fibrous gypsum | Transformer oil | 1,000 | 1,000 | 1,000 | 1,500 |
| | Polyester resin | 1,400 | 2,500 | 1,200 | 3,000 |
| | Epoxy resin | 1,500 | 2,500 | 1,200 | 2,500 |
| | Silicone 200 | 800 | 2,200 | 750 | 1,800 |
| | Heavy mineral oil | 400 | 1,000 | 300 | 1,000 |
| Chrysotile (Russian) | Transformer oil | 120 | 220 | 120 | 270 |
| | Polyester resin | 600 | 1,000 | 525 | 1,000 |
| | Epoxy resin | 600 | 1,000 | 500 | 1,000 |
| | Silicone 200 | 300 | 700 | 525 | 650 |
| | Heavy mineral oil | 200 | 260 | 200 | 260 |
| Fibrofrax (aluminum silicate fibre) | Transformer oil | | | 300 | |
| | Polyester resin | | | 500 | |
| | Epoxy resin | | | 500 | |
| | Silicone 200 | | | | |
| | Heavy mineral oil | | | 300 | |
| Amosite (S. Africa) | Transformer oil | 90 | 250 | 80 | 200 |
| | Polyester resin | 1,100 | 2,400 | 750 | 800 |
| | Epoxy resin | 1,250 | 2,500 | 800 | |
| | Dow silicone 200 | 150 | 300 | 100 | 300 |
| | Heavy mineral oil | 950 | | 200 | 500 |
| Crocidolite (S. Africa) | Transformer oil | 250 | 350 | 180 | 300 |
| | Polyester resin | 900 | 1,200 | 850 | 1,000 |
| | Epoxy resin | 950 | 1,200 | 830 | 1,200 |
| | Silicone 200 | 350 | 450 | 300 | 450 |
| | Heavy mineral oil | 350 | 450 | 275 | 400 |
| Actinolite | Transformer oil | 300 | 1,000 | 350 | 800 |
| | Polyester resin | 760 | 1,200 | 625 | 1,075 |
| | Eopxy resin | 750 | 1,250 | 650 | 1,100 |
| | Silicone 200 | 700 | 1,250 | 550 | 1,000 |
| | Heavy mineral oil | 500 | 1,100 | 400 | 1,000 |
| Silicone nitride | Transformer oil | Not noted | | 250 | 400 |
| | Polyester resin | | | 300 | 550 |
| | Epoxy resin | | | 300 | 550 |
| | Silicone 200 | | | 300 | 500 |
| | Heavy mineral oil | | | 250 | 400 |
| Anthophyllite | Transformer oil | 400 | 1,000 | 200 | 400 |
| | Epoxy resin | 1,600 | 2,200 | 1,600 | 2,200 |
| | Polyester resin | 1,600 | 2,200 | 1,800 | 2,400 |
| | Silicone | 1,600 | 2,000 | 600 | 1,200 |
| Copper wire, 22 gauge [2] | Polyester resin | 120 | 200 | 100 | 150 |
| | Epoxy resin | 130 | 225 | 100 | 150 |
| Tungsten wire [2] | Polyester resin | 200 | 250 | 150 | 200 |
| | Epoxy resin | 200 | 250 | 200 | 250 |
| | Silicone 200 | 90 | 130 | 60 | 125 |
| Nichrome wire [2] | Polyester resin | | | 100 | 200 |
| | Epoxy resin | | | 100 | 200 |
| Iron (fine wool cuttings) [2] | Polyester resin | 75 | 100 | 70 | 90 |
| | Epoxy resin | 88 | 100 | 70 | 90 |
| | Heavy mineral oil | 38 | 80 | 75 | 90 |
| | Silicone 200 | 50 | 200 | 50 | 200 |
| Gold wire | Mineral oil | | | 110 | 150 |
| Carbon filament | do | | | 80 | 100 |
| Vein chrysotile asbestos fibre (Thetford area) | Transformer oil | 90 | 220 | 110 | 230 |
| | Polyester resin | 150 | 300 | 150 | 300 |
| | Epoxy resin | 200 | 300 | 150 | 250 |
| | Silicone 200 | 300 | 500 | 300 | 500 |
| | Heavy mineral oil | 100 | 250 | 110 | 240 |

[1] Polyester resin, Epoxy resin, Silicone 200-Dow Silicone 200, Heavy mineral oil. Orientation and chaining is not necessarily restricted to the above liquids.

[2] The minimum voltage required for orientation and chaining depends on the type of material, shape, size, anisotropic or isotropic, temperature of the liquid and material and the time allowed for orientation of the particles. Varying the temperature will alter the viscosity and dielectric constant of the suspension and the voltage gradient necessary for orientation and chaining. Allowing more time for orientation will result in lower voltage-gradient requirements. The values noted were for static experiments, similar values have been obtained for a dynamic system (fibres flowing in dielectric liquids).

were allowed to vaporize and stain the fibre. Excess staining caused matting, therefore, the fibres were removed after receiving the light stain.

The results of the staining experiments are shown in Table 4.

TABLE 4.—FIBRE STAINING

| Dye Used | Staining Ability | Leaching (fading) of Dye in liquids |
| --- | --- | --- |
| Iodine | Good | No leaching. |
| Malachite Green | do | Some leaching in silicone. |
| Eosin B | do | No leaching. |
| Basic Fuchsin | do | Some leaching in silicone. |
| Crystal Violet | do | Leaching in epoxy resin. |
| Eriochrome Black T | do | Leaching in silicone. |

Iodine appeared to be the most suitable dye. It is simple to use and avoids wetting or matting of the fibres, and little or no leaching occurs in any of the liquids used for dispersion of the fibres.

ORIENTATION IN PLASTIC MATRIX

Figure 3A:
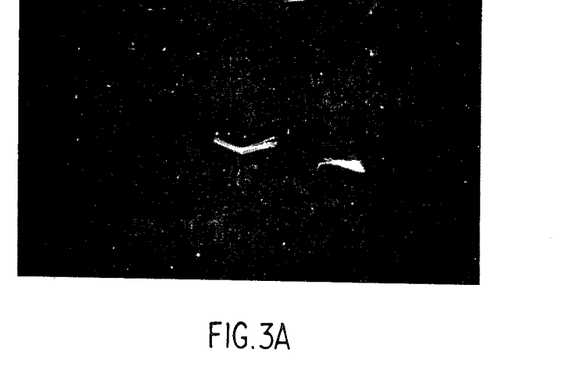
Figure 3B:
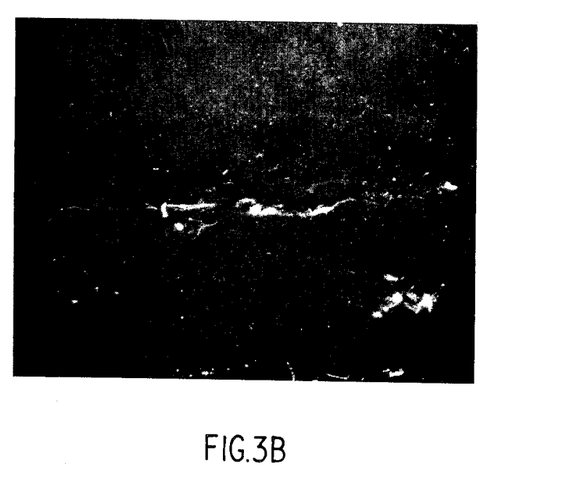

FIGURE 3 shows the effect of an A-C field on dyed asbestos fibres in a polyester resin. FIGURE 3(a) shows the orientation of the fibres and FIGURE 3(b) indicates the chaining effect after increasing the field strength. The selected resin also showed birefringence indicative of alignment of the plastic particles.

Asbestos fibre is used as a filler in plastics and its orientation is said to increase the ablative property of the plastic. The method of orientation developed in this investigation has a potential industrial application in the production of plastics with oriented fibres, which will strengthen the plastics in the preferred direction.

CONTINUOUS TAPE

Very preliminary attempts to disperse the fibre on a continuous tape did not succeed because of the chaining effect. A voltage sufficient to overcome the friction of a fibre on a surface such as glass or plastic produced chaining of the fibres. Lubrication of the surface with resins, oils etc. did not help.

Preliminary calculations showed that 0.2 g. of a 4 group fibre required approximately 400 ft. of ¼ in. wide tape. This great length is considered uneconomical and unwieldy for a practical measuring system.

In view of this the possibility of developing a dynamic system was explored. A continuous moving suspension of fibres through a rectangular guide was considered analogous to a continuous tape. The ability to study the suspension at intervals with a common time base, provide a means of securing a scientifically designed sample and was a factor in influencing the course of the dynamic study.

DYNAMIC SYSTEM

Apparatus

The experimental apparatus in the dynamic system consisted essentially of a rectangular glass channel through which a suspension of fibre in oil flows. The cross sectional dimensions of the channel were 1¼ x ⅛ in. A reservoir containing the suspension was disposed at one end of the channel. The middle section consisted of clear glass for ease of viewing and photography. The exit end was tapered so that a ⅜ in. rubber or plastic tubing could be attached. The flow rate of the suspension was controlled by an adjustable clamp on the tubing. At the top and bottom of the viewing section were two brass electrodes, 6 inches in length, cemented into the system with an epoxy resin. These were connected to a high voltage power source through a variable transformer. This positioning of the electrodes had been selected since the fibres were observed to orient themselves essentially perpendicular to the direction of flow, under laminar flow conditions and the physical configuration of the flow channel. Therefore less voltage was necessary to place the fibre in preferred orientation. Fibre dimension analysis by automatic scanning and counting should be simplified when the fibres are vertically oriented.

G. Mason, in "Fibre Motion and Flocculation" Tappi, 37, (11), (1954), observed that straight rigid cylinders rotate about the Z axis in a spherical elliptical orbit shown schematically in FIGURE 4.

Figure 4:
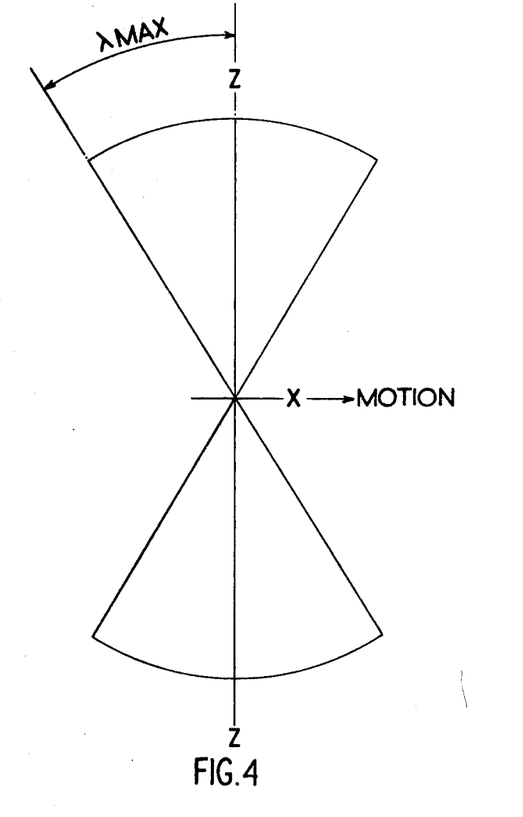
FIG. 4 is a diagram of X–Z projection of a rotating cylinder (After Mason)

It is postulated that a rectangular channel must restrict the elliptical orbiting to an extent fixed by the geometry and permit oscillations primarily in the X-direction. When voltage is applied across the electrodes, the oscillations are further restricted due to the field. The major forces acting on the fibre result from hydraulic flow and the electrical field.

Considerable effort was applied to the development of an apparatus configuration suitable for controlled experiments. This configuration was then used on asbestos samples of different fibre groups and to select suitable operating conditions. In view of the fact that no scanning system was available, the moving stream was photographed in order to study further behaviour. Purely as an aid to photography the fibres were dyed.

Asbestos samples used in this programme were supplied by Quebec Asbestos Mining Association. 0.2 gram portions were selected by a standard sampling procedure to provide samples for study. These were dispersed in two litres of oil by stirring. The mixture was then poured into the reservoir, and kept in suspension by mechanical stirring. A concentration of approximately 0.1 gram of fibre per litre of fluid was found to be optimum for all groups except No. 3. The latter did not disperse fully at concentrations as low as 0.01 gram/litre. Although dispersion was not the best under these conditions, it should be understood that this experiment was to size the fibres only. Orientation was still possible although dispersion was not completely satisfactory. After filling the channel the rate of flow was set. Various flow rates were used during the experiments.

Photographs of the suspension were taken through the viewing section of the channel with, (a) a Bolex and (b) a Milliken 16 mm. camera. The Bolex camera was operated at 64 frames per second and the Milliken at 128 frames per second. The Bolex was activated every 30 seconds for periods of 10 second duration and the Milliken for 5 seconds duration.

A relatively fast flow was found to give optimum dispersion and freedom from "hang up" on the electrodes. Dispersion was satisfactory for all grades except No. 3. The large fibres became entangled and could not be dispersed.

It is believed that the finest fibres are not visible but that the visible fibres are sufficiently representative of the sample.

Figure 5:
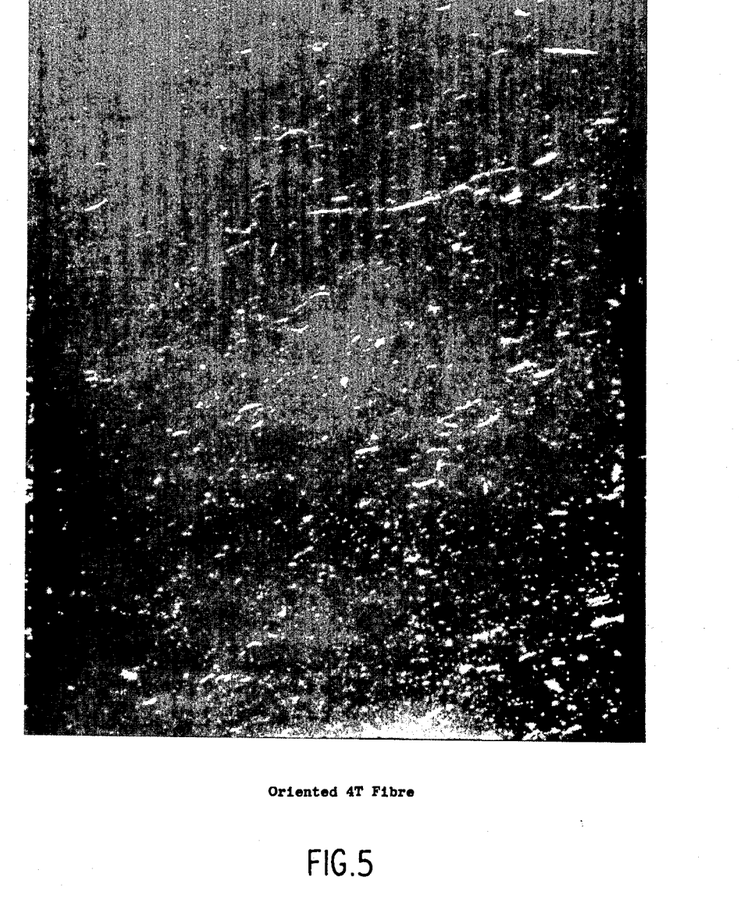
FIG. 5 shows a single exposure of oriented 4T fibre in a dynamic orienting system.

An enlarged frame of a film taken by the Bolex camera is shown in FIGURE 5. The photograph represents an area 1 x 1 in. out of the total viewing section of 1¼ x 6 in.

All the fibres appear well dispersed and oriented. It was surprising to note the very large number of short fibres. The photograph is essentially in one plane due to the short depth of field and the low concentration of fibres.

An actual count and measurement of the fibres was made from the photographs. The length distribution obtained was compared with results from other methods, such as Suter Webb and Bauer-McNett as disclosed in the Manual of Testing Procedures for Chrysotile Asbestos Fibre, March 1962, at pages 29-34 and 41-50, respectively, previously obtained by Woodrooffe in unpublished data.

The number of fibres and length distribution are shown in Table 5.

TABLE 5.—FREQUENCY OF PARTICLES DISTRIBUTION OF A 4T FIBRE OBTAINED FROM A FILM

| Fibre Length, mm | 1 | 1-2 | 2-3 | 3-4 | 4-5 | 5-6 | 6-7 | 7-8 | 8-9 |
|---|---|---|---|---|---|---|---|---|---|
| Frequency | 14,239 | 653 | 134 | 37 | 16 | 6 | 5 | 4 | 2 |
| Frequency, percent | 94.4 | 4.32 | 0.82 | 0.24 | 0.11 | 0.4 | 0.003 | 0.027 | 0.013 |
| Frequency, percent, excluding fibres 1 mm. or less | | 76.2 | 15.6 | 4.30 | 1.89 | 0.70 | 0.60 | 0.47 | 0.24 |

It will be appreciated that Table 4 is a distribution for one particular case and does not include a mass factor to permit a distribution of fibre length by weight. However, it appeared interesting to compare these results with a Bauer-McNett determination on a similar fibre. This comparison is shown in Table 5. The results of the Bauer-McNett were adjusted to metric scale equivalent key lengths shown in Table 4. It should be realized that the Bauer-McNett distribution in Table 5 is weight percentage and the film count is a percentage based on frequency.

TABLE 6.—COMPARISON OF BAUER-McNETT AND FILM COUNT METHODS FOR MEASURING FIBRE LENGTH USING 4T GRADE

| Fibre Length Classification, mm | 2 | 1-2 | 1 |
|---|---|---|---|
| Bauer-McNett, wt. percent | 5.8 | 6.2 | 88.0 |
| Film Count—Frequency, percent | 1.4 | 4.3 | 94.3 |

Table 6 is an analysis of 4K sample Suter-Webb determination adjusted to metric scale equivalents with a film count on a 4T sample in the dynamic system.

TABLE 7.—COMPARISON OF SUTER-WEBB AND FILM COUNT METHODS FOR MEASURING FIBRE LENGTH

| Fibre Length, mm | 2 | 2-5 | 5-8 | 8-11 |
|---|---|---|---|---|
| Suter-Webb, wt. percent (4K Sample) | 71.4 | 22.3 | 4.5 | 1.7 |
| Film Count—Frequency, percent (4T Sample) | 76.2 | 21.8 | 1.8 | 0.2 |

(a) The samples shown in Tables 6 and 7 are different grades and processed by different manufacturers.

(b) The Bauer-McNett and Suter-Webb methods are based on a weight-length distribution and the film count is based on a number-length (frequency) distribution.

(c) The class intervals are approximate only.

(d) The Suter-Webb method allows some shorter fibres to adhere to the longer fibres and to pass through the comb.

In a comparison of the two methods it would be expected that the film count technique would reveal a higher proportion of minus 2 mm. fibres than the Suter-Webb combing method. It is realized that the average length of 4T fibre is less than a 4K. Consequently, the small difference in the minus 2 mm. portion should not be taken as a positive confirmation that the Suter-Webb method is less selective in the smallest length fraction.

Within the limits of experimental error, at this stage, a relationship between weight percent and frequency percent can be deduced. If a particular fibre is dispersed to the same degree and sorted into reasonably small length increments then, because of the numerically great $l/d$ ratio within any length increment, there is a similarly between the proportion of fibre of this increment either by mass or by unit count.

Practical applications of this invention include:

(a) orientation of the fibres in a fluid, resin and hardener, and allowing the resin to harden with the fibre in the oriented position, (b) allowing the fibres to form strands in fluid plastics using short or longer fibres, and allowing the matrix to harden with fibre in the oriented position.

We claim:

1. The method of orienting asbestos fibers comprising the steps of:
   (i) dispersing said fibers in a liquid medium,
   (ii) subjecting said liquid medium and the dispersed fibers to an electric field and
   (iii) maintaining said field at a selected intensity to orient said fibers substantially parallel to each other.

References Cited

UNITED STATES PATENTS 2,418,479    4/1947    Pratt et al. _________ 117—93 XR
2,998,048    8/1961    Sittel _____________ 118—621 XR S. LEON BASHORE, Primary Examiner R. H. TUSHIN, Assistant Examiner U.S. Cl. X.R.

162—153; 264—24, 108